(12) United States Patent
Wigder

(10) Patent No.: US 11,126,456 B2
(45) Date of Patent: Sep. 21, 2021

(54) TRACKING USAGE OF USER INTERACTION DATA USING BLOCKCHAINS

(71) Applicant: Flipboard, Inc., Palo Alto, CA (US)

(72) Inventor: David E. Wigder, Bronx, NY (US)

(73) Assignee: Flipboard, Inc., Redwood City, CA (US)

( * ) Notice: Subject to any disclaimer, the term of this patent is extended or adjusted under 35 U.S.C. 154(b) by 226 days.

(21) Appl. No.: 16/112,621

(22) Filed: Aug. 24, 2018

(65) Prior Publication Data

US 2020/0065137 A1 Feb. 27, 2020

(51) Int. Cl.
| | |
|---|---|
| *G06F 9/46* | (2006.01) |
| *G06F 21/60* | (2013.01) |
| *H04L 9/06* | (2006.01) |
| *G06F 16/23* | (2019.01) |

(52) U.S. Cl.
CPC .......... *G06F 9/466* (2013.01); *G06F 16/2379* (2019.01); *G06F 21/602* (2013.01); *H04L 9/0637* (2013.01)

(58) Field of Classification Search
CPC ..... H04L 9/0637; G06F 9/466; G06F 21/602; G06F 16/2379
See application file for complete search history.

(56) References Cited

U.S. PATENT DOCUMENTS

| | | | |
|---|---|---|---|
| 2018/0336267 A1* | 11/2018 | Rogers | G06F 16/1837 |
| 2020/0013118 A1* | 1/2020 | Treat | G06Q 40/04 |
| 2020/0058007 A1* | 2/2020 | Karame | H04L 63/101 |
| 2020/0058023 A1* | 2/2020 | Travizano | G06Q 30/00 |

* cited by examiner

*Primary Examiner* — Hau H Hoang
(74) *Attorney, Agent, or Firm* — Fenwick & West LLP

(57) ABSTRACT

A user interaction data storage system stores user interaction data received from online systems as records. Each record of user interaction data describes user interactions performed by a user with an online system. A system, for example, a content provider system performs data access requests to access user interaction data so as to determine whether a user is likely to be interested in a content item. A plurality of online systems store a block chain comprising blocks that records transactions. Some transactions of the block chain are associated with data contribution operations and some transactions of the block chain are associated with data consumption operations.

20 Claims, 9 Drawing Sheets

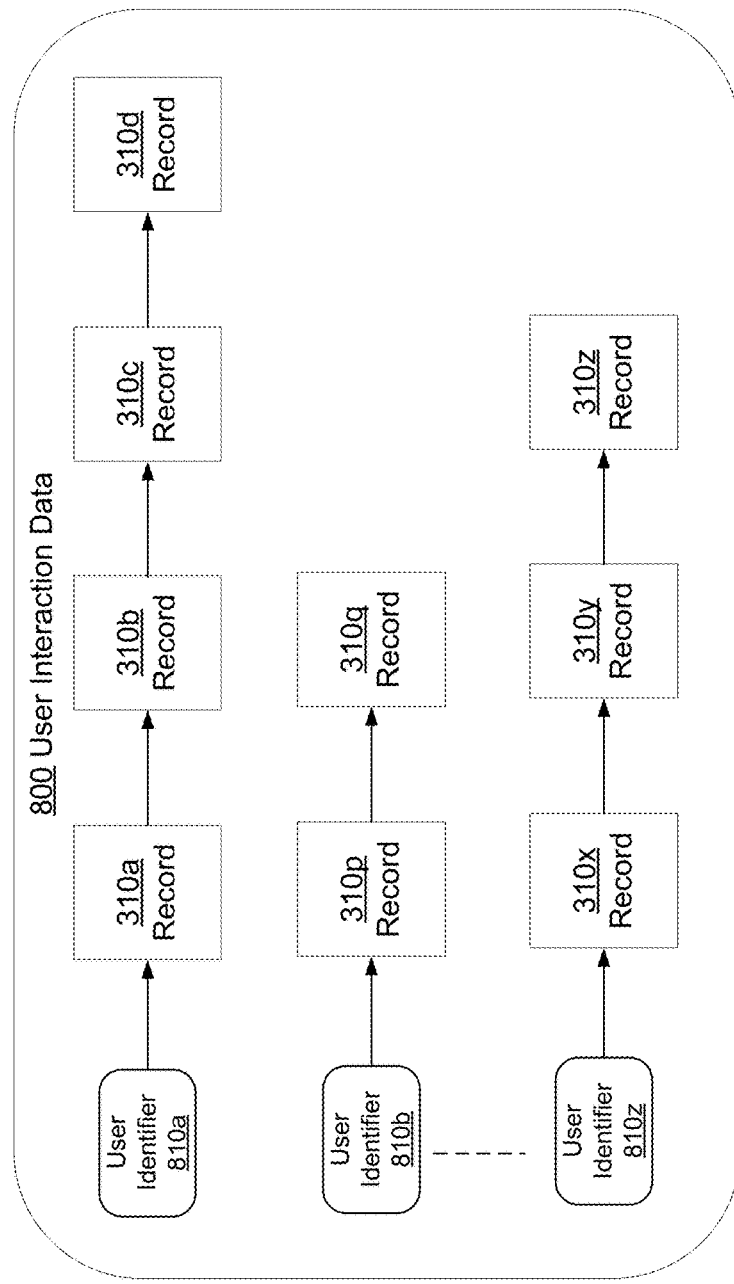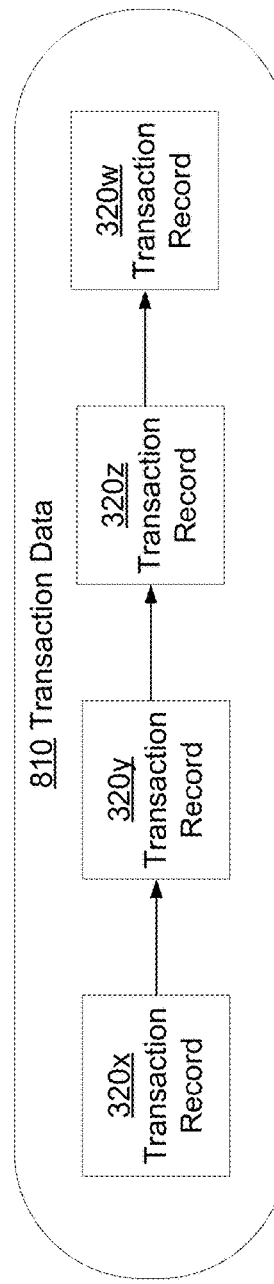
FIG. 8A
FIG. 8B

TRACKING USAGE OF USER INTERACTION DATA USING BLOCKCHAINS

BACKGROUND

This invention relates to distribution of content based on user interaction data in general and more specifically to using blockchains for tracking usage of user interaction data across a plurality of online systems.

Online systems provide content to users, for example, newsfeed comprising text, images, videos, and so on. Online systems monitor user interactions to determine the type of content that should be provided to specific users. For example, user interactions with a website may indicate that the user is interested in a particular topic and is likely to view content related to that topic. Similarly, a user performing searches for specific topics may indicate that the user is interested in content related to those topics.

However, users typically interact with multiple online systems over a time period. For example, a user may access content related to a specific topic across one online system and perform searches for related topics on a different online system. As a result, a particular online system has information describing the user interactions with that particular online system but does not have comprehensive information describing the user interaction pattern across multiple online systems. Accordingly, each online system can provide content to users based on user interactions received by that online system. Therefore, conventional systems lack the aggregate user interaction data that can be utilized to make accurate decisions regarding distribution of content to the users.

SUMMARY

A system receives user interaction data from online systems and stores the user interaction data as records. The user interaction data describes user interactions performed by a user with various online systems. A particular online system may access stored user interaction data to make certain decisions, for example, to determine whether a certain content item is likely to be of interest to a user. Transactions associated with data contribution operations and data consumption operations are stored on a block chain. Data contribution refers to an online system contributing new user interaction data and data consumption refers to an online system accessing stored user interaction data.

A query representing a data access request for user interaction data is received by a system from a source online system. The data access request specifies a search criteria, for example, user interactions performed by a user in a given time interval or user interactions matching certain topics or keywords. The system determines a value of the data access request and identifies a set of records matching the search criteria of the data access request. For each matching record, the system identifies the online system that contributed the record. A portion of the value of the data access request is added to a profile of the identified online system. Transactions indicating changes in the values of online systems are stored in a block chain across a plurality of online systems. The source online system may use the result of the data access request to determine whether to send certain content items to a user.

In one embodiment, the user interaction data is stored in a storage system, for example, a database and blocks of the block chain store metadata identifying records storing the user interaction data in the storage system.

In another embodiment, the transaction data is stored in a database that is replicated across a plurality of online system. For example, an online system may collect a set of transactions and then broadcast the set of transactions to the remaining online systems of the plurality of online systems. The plurality of online systems ensures that a single online system does not modify the data without consensus of all the remaining online systems.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 illustrates a system environment for aggregating user interaction data across a plurality of online systems, according to an embodiment.

FIGS. 8A, 8B illustrate matching of user identifiers to aggregate user interaction data, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
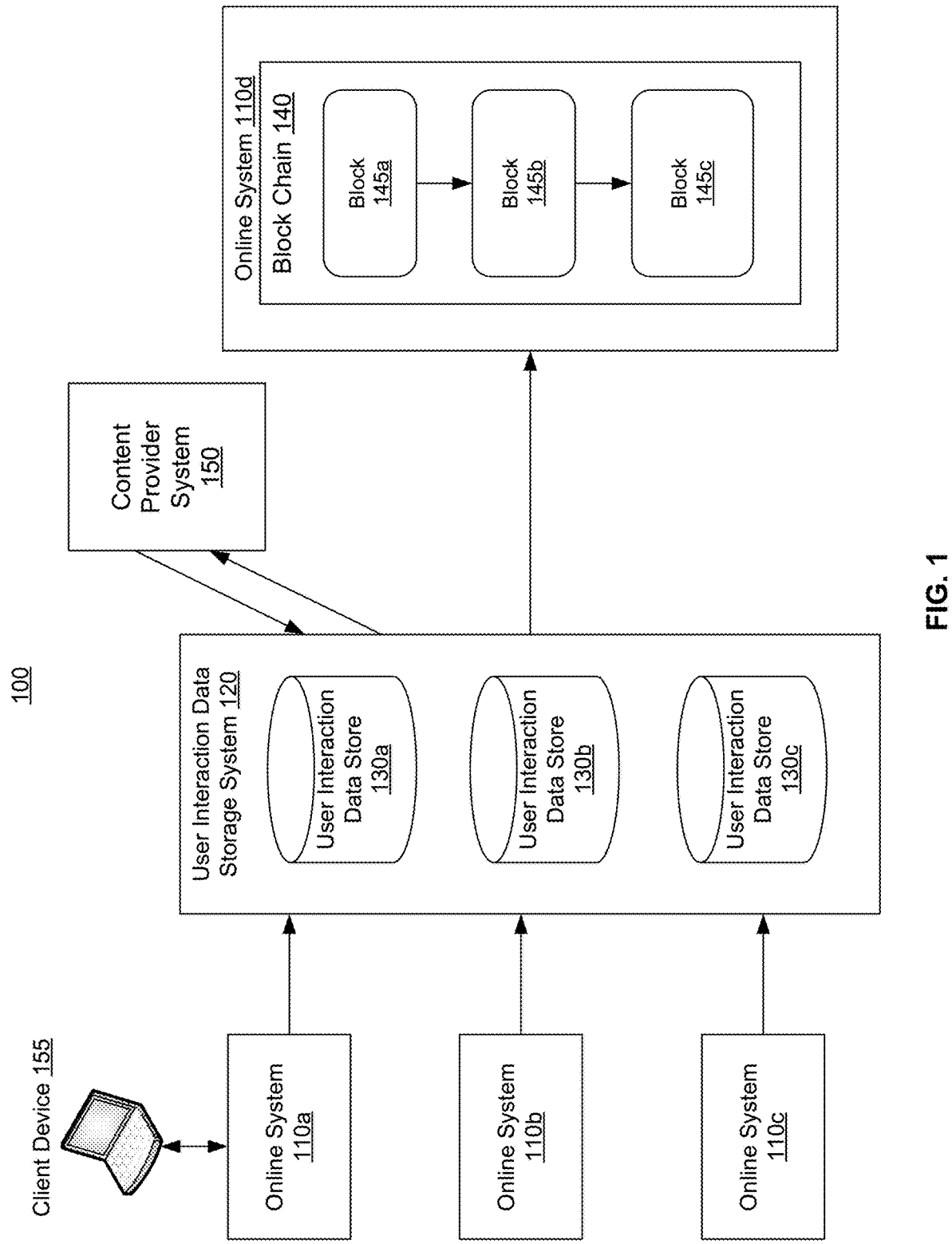

Figure (FIG. 1 illustrates a system environment for aggregating user interaction data across a plurality of online systems, in accordance with an embodiment of the invention. The system environment 100 comprises a plurality of online systems 110, one or more client devices 155, a user interaction data storage system 120, and one or more content provider systems 150. Other embodiments may include more or fewer systems than those indicated herein.

The online systems 110 receive user interactions, for example, user interactions performed via client devices 155. The online systems 110 store user interaction data in the user interaction data storage system 120. A content provider system 150 may access the data stored in the user interaction data storage system 120 and use it for distributing content items to users. One or more online systems 110 store a block chain 140 for storing information describing transactions, such as transactions corresponding to data contribution or data consumption by one or more online systems/content provider systems. For example, metadata describing data contribution is recorded in the block chain 140 when an online system 110 provides new user interaction data to the user interaction data storage system 120. Metadata describing data consumption is recorded in the block chain 140 when a content provider system 150 uses the data stored in the user interaction data storage system 120, for example, for determining whether a certain content item should be provided to a user.

The system environment 100 allows efficient distribution of content items to users based on the current interests of users. Providing content items to a user that is not interested in the content item results in waste of computing and communication resources. For example, any computing and communication resources used to provide a content item that a user never accesses are wasted. In contrast, the system environment 100 provides content items to a user that the user is highly likely to access, thereby reducing the likelihood of waste of computing and communication resources used for providing the content item to the user.

In an embodiment, the system environment 100 stores data representing transactions in any distributed ledger implementation. A distributed ledger represents a data structure that is replicated across a plurality of computing systems that is used for tracking transactions. A computing system is a system that can perform the role of multiple systems shown in FIG. 1. For example, an online system 110 may also act as a content provider system 150. Similarly, an online system 110 can also act as a user interaction data storage system 120. Furthermore, a block chain 140 may be stored on a plurality of online systems 110. The information on a ledger is securely and accurately stored using cryptography and can be accessed using keys and cryptographic signatures. A distributed ledger maintains multiple copies of the data on different computing systems.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

An online system 110 can be a website, a client application executing on a client device, or any system that provides user interaction data. An online system 110 may be a content distribution system that allows users to access content items, for example, text documents, videos, images, and so on. An online system 110 may be a website that allows users to perform a certain operation, for example, execute transactions, register with a system, and so on. An online system 110 may be a client application associated with a website that allows users to interact with the website.

The system environment 100 collects and stores user interaction data. A content provider system 150 accesses the user interaction data for determining whether to provide certain content items to certain users. For example, user interaction data collected from one or more online systems 110 may indicate that the user is searching for certain topic. Furthermore user interaction data from another online system may indicate that the user purchased certain items associated with the same topic. Accordingly, a content provider system 150 may provide content related to the topic to the user.

In some embodiments, the user interaction data storage system 120 is a database, for example, a relational database storing the user interaction data in one or more database tables. The user interaction data storage system 120 receives user interaction data from online systems 110 and stores the user interaction data as records. A record of user interaction data may specify various attributes, for example, an identifier for the online system 110 that provided the user interaction data, an identifier for the user that performed the user interaction, a timestamp indicating a time of the user interaction, a type of user interaction (e.g., a search operation, a purchase transaction, information access, and so on), a topic associated with the user interactions (e.g., a topic that the user was searching on, a type of product or service that the user as purchasing, or a topic of content item accessed by the user), and so on.

The user interaction data storage system 120 stores user interaction data on one or more user interaction data stores 130. Each user interaction data store 130 may be stored on a separate server that represents a storage system. The user interaction data storage system 120 may partition the data and store user interaction data for each subset of users on a separate user interaction data store 130. In some embodiments, the user interaction data storage system 120 is a distributed database that stores data across a plurality of computing systems.

The content provider system 150 stores content items for distribution to various users. A content item may comprise a video, an image, an audio, text, and so on. The content provider system 150 may distribute the content items to users directly or use a content publishing system to distribute the content items. A content item may describe a particular topic for example, sports, news, science, and so on. A content item may describe a product or service provided by the content provider system 150 or by an enterprise associated with the content provider system 150.

A content item may be a sponsored content item, for example, a sponsored content item distributed by a content publishing system on behalf of a content provider system 150. An example of a sponsored content item is an online advertisement that may be provided by a content provider system 150, for example, an advertiser system that provides advertisements. A content provider system 150 could be a media sharing system that provides media objects for example, videos or images of interest to users based on their user interaction history.

One or more online systems store a block chain 140 comprising blocks of data recording transactions. A transaction is associated with an update to a value of one or more accounts associated with online systems 110. For example, a transaction may represent a data contribution by an online system 110 that corresponds to an increase in value of an account associated with the online system 110 as a result of new user interaction data provided by the online system 110. A transaction may represent an increase in value of an account of an online system 110 as a result of queries executed against user interaction data provided by the online system 110. A transaction may represent a decrease in value of an account of an online system 110 as a result of queries executed by the online system 110 for accessing user interaction data provided by other online systems 110.

The data stored in a block of a block chain 140 representing a transaction may comprise a pointer to user interaction data stored in the user interaction data storage system 120. For example, if an online system 110 adds a record of user interaction data to a user interaction data storage system 120, the block chain 140 stores a transaction that comprises a pointer to the record. Each record of user interaction data may be identified using a unique identifier stored as a primary key in the user interaction data store 130. A transaction may identify a record using a pointer to a record of a value of a primary key identifying the record.

A block may include a reference to another block, for example, the block created before the current block, thereby creating the block chain 140. A block records information describing user interaction data. For example, a block may record a reference to a particular user interaction stored in the user interaction data storage system 120. The data stored in a block may represent data contribution instance or data consumption instance. A data contribution represents an instance of an online system 110 providing information describing a new user interaction to the user interaction data storage system 120. A data consumption represents an instance of an online system 110 accessing the user interaction data storage system 120 to use the data, for example, to determine a type of content that should be sent to a user at a given time.

The client device 155 used by a user for interacting with the online system 110 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 155 can be any device having computer functionality, such as a personal digital assistant (PDA), mobile telephone, smartphone, wearable device, etc.

In an embodiment, a client device 155 executes a user interface to allow the user to interact with the online system 110. The user interface allows the user to perform various actions associated with the online system 110 and view information provided by the online system 110. The user interactions performed by a user using the user interface include accessing content items, performing searches, executing transactions such as purchases, registering with a website, and so on. In an embodiment, the user interface is presented to the user via a browser application that allows a user to retrieve and present information from the Internet or from a private network.

The interactions between the client devices 155 and the online system 110 are typically performed via a network, for example, via the Internet. The network enables communications between the client device 155 and the online system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

User Interaction Data

Figure 3:
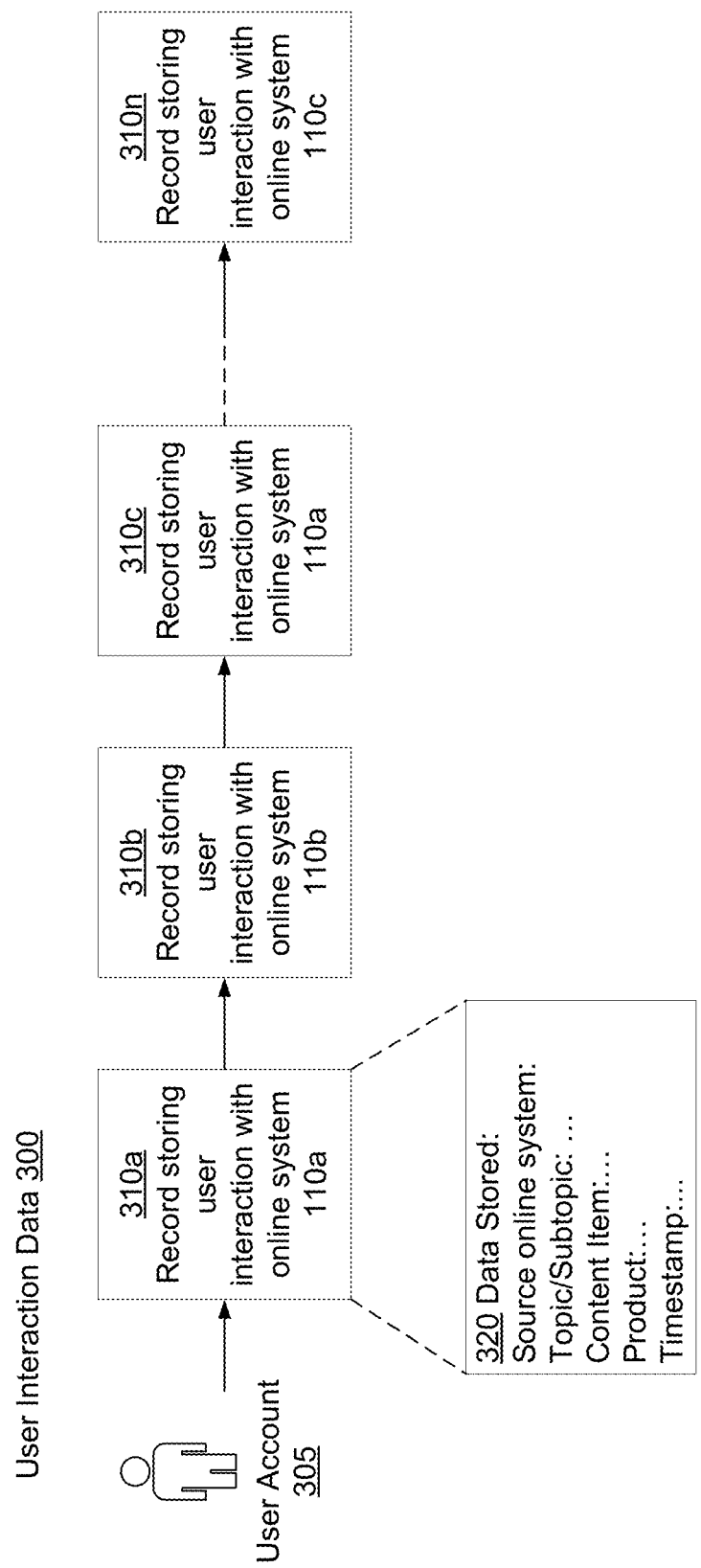
FIG. 3 is a diagram illustrating the data structure storing user interaction data, according to an embodiment.

FIG. 3 is a diagram illustrating the data structure storing user interaction data, according to an embodiment. The user interaction data is stored in the user interaction data storage system 120. In an embodiment, the user interaction data storage system 120 stores a set of records 310 for each user account 305. For example, an online system 110 may send information describing a user interaction or a set of related user interactions to the user interaction data storage system 120. The user interaction data storage system 120 stores a record representing the received user interaction data. The record 310 may record various attributes in the record. One attribute stored in the record represents an identifier for the source online system 110 that provided the user interaction data. Another attribute represents a topic/subtopic describing the user interaction, for example, a topic of searches performed by the user via the online system 110 or a topic of content accessed by the user from the online system 110. Another attribute represents information identifying a content item accessed by the user, for example, a uniform resource locator (URL) of a video, image, or a web page. Another attribute describes an item associated with the user interaction, for example, a product or service that is the subject of a transaction, such as a purchase by the user. Another attribute represents the time of the user interaction that may be stored using a timestamp value. In an embodiment, the user interaction data may be stored at a location within the user interaction data storage system 120 (or another storage system) that is different from the record and the record stores metadata describing the location of the user interaction data.

As illustrated in FIG. 3, the user account is associated with various records including a record 310a that records (i.e., stores) data describing a user interaction with online system 110a, a record 310b that records data describing a user interaction with online system 110b, a record 310c that records data describing another user interaction with online system 110a, and so on including a record 310n that records data describing a user interaction with online system 110c.

Figure 4:
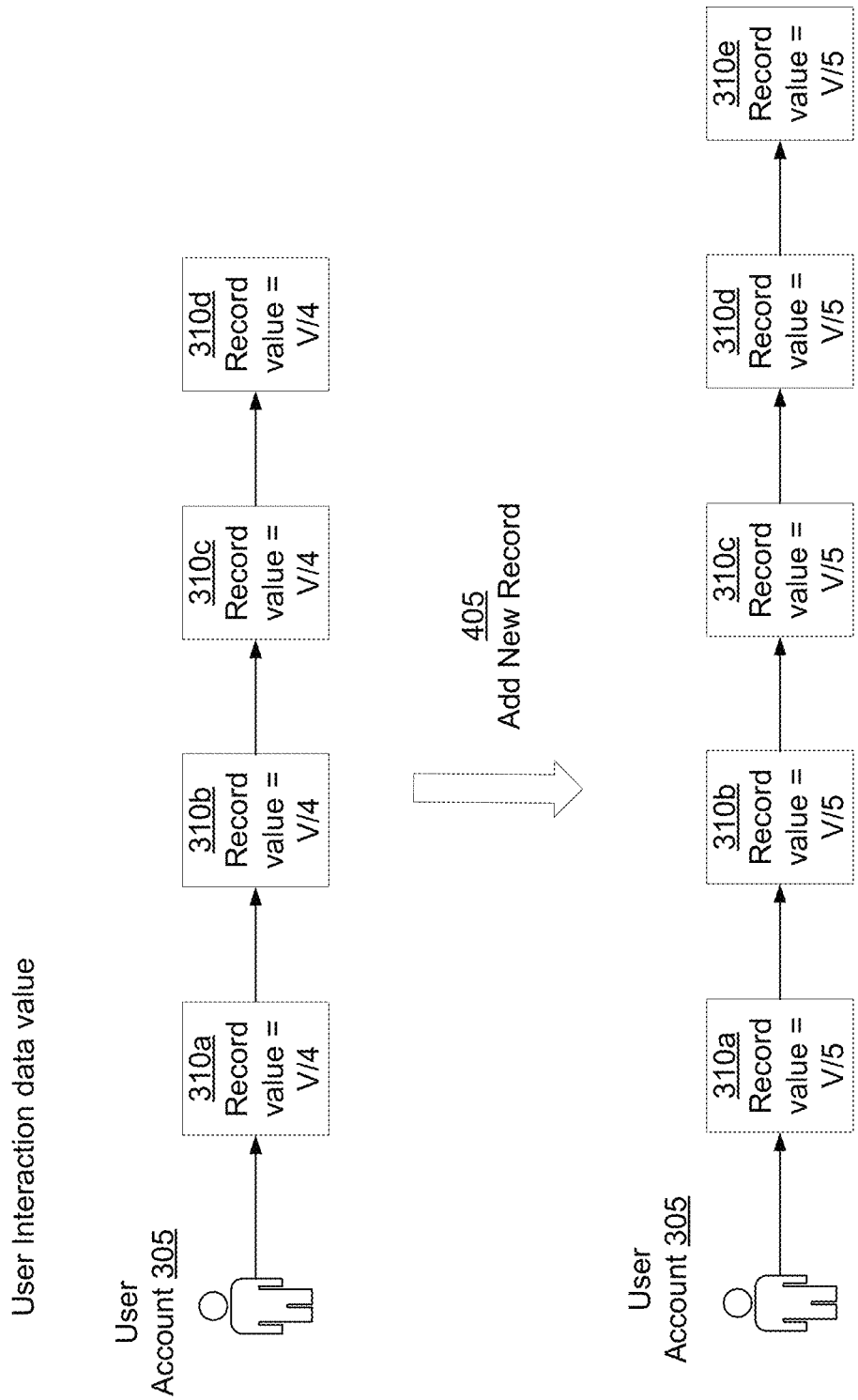
FIG. 4 is a diagram illustrating the change in value of data describing user interactions, according to an embodiment.

FIG. 4 is a diagram illustrating the change in value of data describing user interactions, according to an embodiment. The online system 110 receives and processes data queries. For example, a content provider system 150 may request information describing the types of user interactions performed by a user within a recent time interval. The online system 110 associates a value with the data provided in response to the query that is distributed across the various online systems 110 that provided the user interaction data returned in response to the query. For example, if the records 310a, 310b, 310c, and 310d are returned in response to the query, and the total value of the data returned as a result of a query is V, each record has a value V/4. However, if a new record 310e is added to the user account 305, the value of each record becomes V/5 if the same query were executed. In some embodiments the value of the same query increases by a certain amount when one or more records get added to the user interaction data storage system that match the query. For example, the value of a query may be V when N records match the query. Accordingly, each record is assigned a value of V/N if all records are assumed to have the same value as a result of the query. However, the value of the query may increase to V+X if K new records are added that result in N+K records matching the query. Accordingly, the value of each record becomes (V+X)/(N+K), assuming each record is assigned the same value as a result of the query.

Online System Architecture

Figure 2:
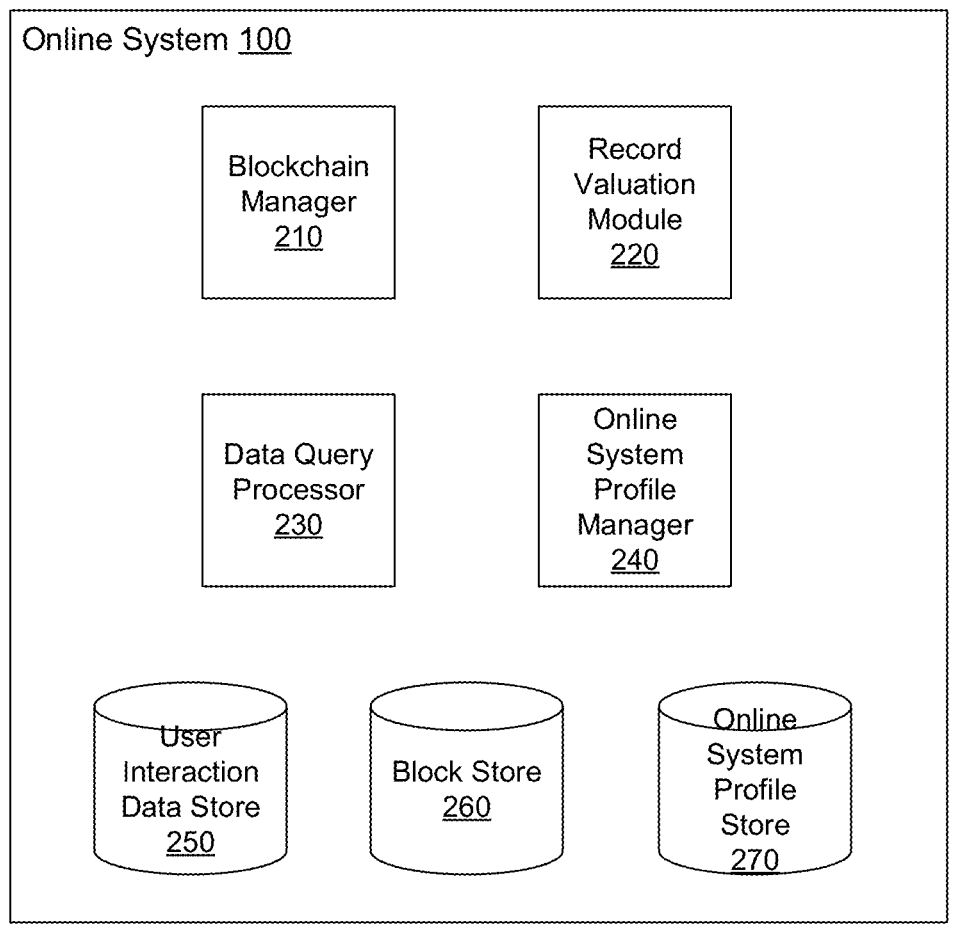
FIG. 2 is a diagram of the system architecture of an online system, in accordance with an embodiment of the invention.

FIG. 2 is a diagram of system architecture of an online system, in accordance with an embodiment of the invention. The online system 110 includes a block chain manager 210, a record valuation module 220, a data query processor 230, an online system profile manager 240, a user interaction data store 250, a block store 260, and an online system profile store 270. In other embodiments, the online system 110 may include additional, fewer, or different modules for various applications. For example, the user interaction data store 250 and the data query processors 230 may be stored in a user interaction data storage system 120 separate from an online system 110. Conventional components such as network interfaces, security mechanisms, load balancers, failover servers, management and network operations consoles, and the like are not shown so as to not obscure the details of the system.

The data query processor 230 receives data access requests and processes them. The data access requests may be received from online systems 110 or a content provider system 150. A content provider system 150 provides content to users. A data access request specifies certain search criteria, for example, a time range to access user interactions for a user that occurred within a time window, one or more keywords, a topic/subtopic associated with matching records and so on.

The user interaction data store 250 stores user interaction data. The user interaction data store 250 may be on a separate system, for example, the user interaction data storage system 120. The user interaction data store 250 stores records, each record comprising information describing one or more user interactions. In an embodiment, each record is associated with a user and records information describing one or more related interactions of that user with an online system 110. In an embodiment, the user interaction data store 250 stores a set of records in association with a user identifier. Examples of a user identifier include an email address, a login ID, a cookie stored on a client device and so on. The user identifier is received along with the user interaction data.

A record representing a user interaction may represent a particular instance of access performed by a user comprising a request sent by the user via a client device 155 to an online system 110 and a response provided by the online system 110 to the client device 155. Alternatively, a record representing a user interaction may represent a sequence of user accesses comprising requests and response that are part of a session performed by the user. For example, a session may comprise, a user logging in to an online system 110 and performing a sequence of operations including search operations and purchase transactions.

The block chain manager 210 performs various operations related to blocks of the block chain. The block chain manager 210 collects transactions and stores them as a block blocks. A transaction may be a data contribution transaction indicating that an online system 110 provided user interaction data. The user interaction data may be stored in the user interaction data store 250. The block chain manager 210 broadcasts blocks that are received by block chain managers 210 executing on other online systems 100. Each block chain manager stores the block in the block store 260. A block chain manager 210 performs other operations related to management of a block chain, for example, performing validation of data stored in blocks, determining hash values associated with a block, and so on. In some embodiments, the online system 110 simply uses a replicated database instead of a block chain for storing transaction data. The replicated database stores multiple copies of each transaction, each copy stored on an online system 110.

In an embodiment, the online system 110 stores the transaction data separate from user interaction data since the transaction data is replicated across a plurality of online systems 110 and the user interaction data can be very large, thereby making replication of blocks inefficient. Separating the user interaction data from the transaction data makes the system efficient in terms of computation and communication. For example, the system does not need the communication bandwidth or the computational resources to replicate all the user interaction data.

The online system profile manager 240 manages profiles of online systems 110 and stores them in the online system profile store 270. A profile of an online system 110 may also be referred to herein as an account of the online system 110. An account of an online system 110 is associated with a value determined based on the past transactions associated with the online system 110. The value of an account may be stored explicitly in the account and updated as transactions associated with the account occur. Alternatively, the current value of an account may be determined based on transactions stored in the block chain.

The profile of an online system 110 stores information identifying the online system 110 and metadata describing the online system 110, for example, an address for communicating with the online system 110, a name of the online system 110, a contact address associated with the online system 110, and so on. The profile of an online system 110 also stores an amount representing a value of the online system 110. The online system profile manager 240 may update the value of the account of an online system 110. For example, if the online system 110 contributes new user interaction data, the account of the online system 110 may be updated to add a value corresponding to the data contributed by the online system 110. Similarly, if the online system 110 consumes data by performing data access requests, the account of the online system 110 may be updated to subtract or reapportion a value corresponding to the data accessed by the online system 110. In an embodiment, an additional fee may be charged to an online system 110 for updates made to the account.

The record valuation module 220 determines values of records. The record valuation module 220 determines an initial value of a record when the record is added to the system. Subsequently, the record valuation module 220 determines values of records for data access requests. For example, if a plurality of records match a data access request, the record valuation module 220 may determine a value of each matching record by dividing the value of the data query by the number of matching records. In some embodiments, the record valuation module 220 determines a value of a matching record based on an age of the record, for example, older records are assigned smaller value than newer records.

Overall Process

Figure 5:
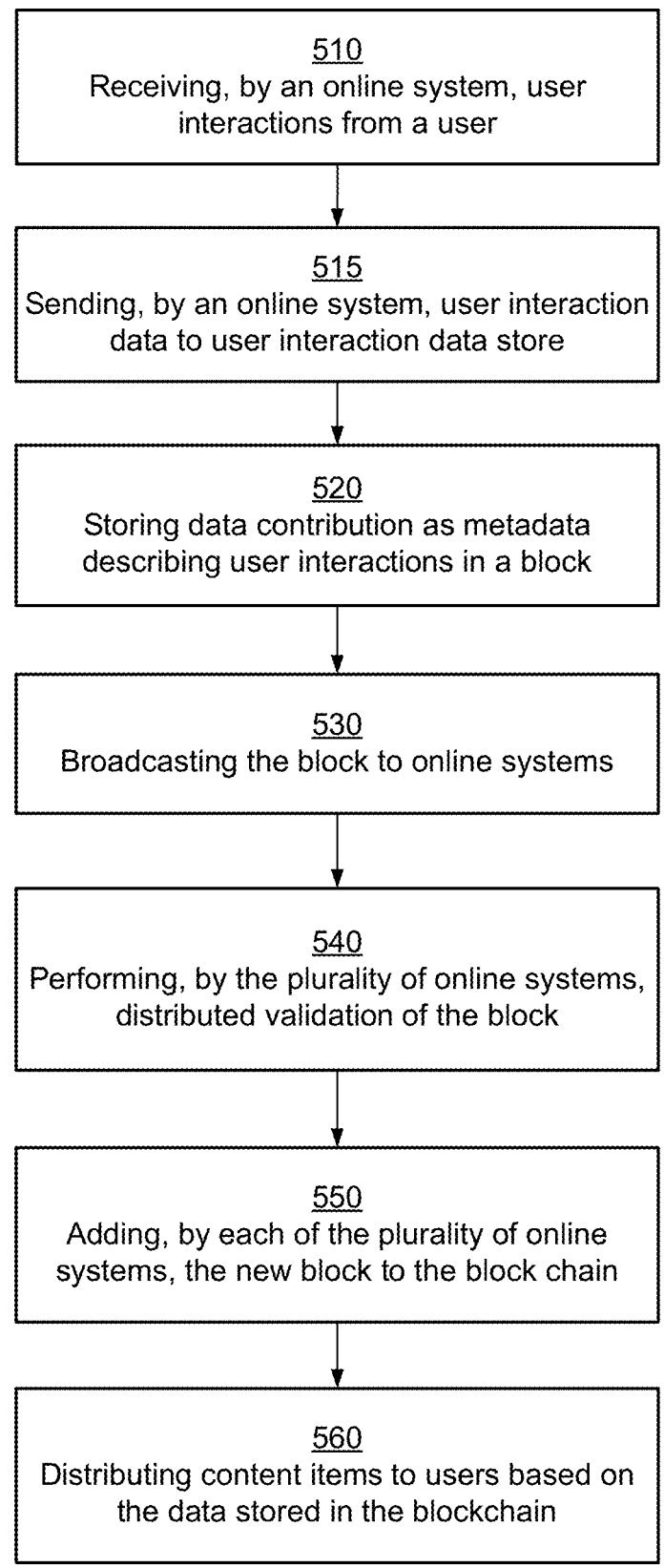
FIG. 5 illustrates a process for processing user interaction data and storing the user interaction data, according to an embodiment of the invention.

FIG. 5 illustrates a process for processing user interaction data and storing the user interaction data, according to an embodiment of the invention.

An online system 110 receives 510 user interactions from a user, thereby generating user interaction data. The online system 110 could be a website, an application, or any other system that can track user interactions. Examples of user interactions include accessing content, performing search operations, performing transactions such as purchases, and so on. The online system 110 may receive a plurality of related user interactions, for example, a series of user interactions performed by a user as part of a session with an online system 110. As an example, a user searching for a specific item may send search requests and may click on certain results returned. In an embodiment, the online system 110 extracts metadata describing the user interactions, for example, the time of user interactions, a topic/subtopic associated with the user interaction, the type of user interaction (e.g., search operation, purchase transaction, website registration, and so on), and so on.

The online system 110 sends 515 the user interaction data to the user interaction data storage system 120 for storing in the user interaction data store 130. In an embodiment, the online system 110 transmits a message encoding the metadata describing the user interactions to the user interaction data storage system 120. For example, the online system 110 generates an object structure that represents the metadata, serializes the object structure and transmits the serialized object to the user interaction data storage system 120.

In an embodiment, the user interaction data storage system 120 receives a user identifier with a user interaction data and determines whether the identifier matches a previously stored user data. The identifier may be an email address used by the user to create a session, a user identifier uniquely identifying the user within the online system 110, a cookie stored on the client device, an advertising ID or any other user identifier. In an embodiment, the user interaction data storage system 120 stores various user identifiers for a user account as received from different online systems 110. For example, if the user logs in with an email address and a cookie is also received from the same client device, the user interaction data storage system 120 stores both the email address and the cookie as identifiers for the user account. In an embodiment, the user interaction data storage system 120 generates an encrypted identifier for the user and uses the encrypted identifier for identifying the user in the block chain. This ensures that any personally identifiable information (PII) of the user is not available to systems other than the user interaction data storage system 120.

In an embodiment, the user interaction data storage system 120 may send information describing the user interaction data received to various online systems 110 for storing in the block chain 140. Each online system 110 stores 520 the data contribution as a record representing a transaction in a block. The data stored in the record includes data type, user interaction type, timestamp, the online system 110 that was the data contributor, and an amount indicating the value of the data contributed. Accordingly, the value associated with an account associated with the online system 110 is increased by an amount representing the value of the data contributed. In an embodiment, an online system 110 broadcasts 530 to other online systems 110, a block storing the data contribution and the change in value associated with each user interaction data contributor based on the newly contributed data. The broadcasted block is stored in the block chain that is replicated across multiple online systems 110. In some embodiments, the online system 110 waits for at least a threshold records representing transactions to be accumulated before broadcasting a block storing the accumulated records.

The plurality of online systems 110 perform a distributed validation 540 of the block. The validation comprises various types of verification steps to ensure that the data stored in the block is accurate. For example, the verification may comprise checking that the various values including the timestamp, the value of the data contribution, and so on are within a predetermined range. The verification may further comprise checking the identity of the online system 110 that contributed the user interaction data to verify that the online system 110 is a valid online system 110. The verification may comprise using predetermined metadata describing the online system 110 to ensure that the online system 110 is configured to perform the type of user interactions that are indicated in the record. For example, certain online systems 110 may be configured to perform only search operations, and others to perform purchase transactions, and so on. Accordingly, if a record is received that indicates a type of user interaction that an online system 110 is not configured to perform, the system performing the verification may determine that the verification fails. The system environment 100 determines that a block is valid if more than a threshold number of online systems 110 verify the block and report that the verification was successful. Responsive to a successful verification of the block, each of the plurality of the online systems 110 adds 550 the new block to the block chain 140.

The updated user interaction data is used by the online systems 110 for distributing 560 content items to user. For example, an online system 110 may be allowed to access the data describing user interactions performed by a user if the online system 110 has more than a threshold amount of value in the account as determined based on past data contributions of the online system 110. Depending on the user interaction data accessed by the online system 110, the online system 110 may send some content item to the user. For example, if the online system 110 determines that the user recently performed various searches of certain topic, the online system 110 may send content items related to that topic to the user.

Figure 6:
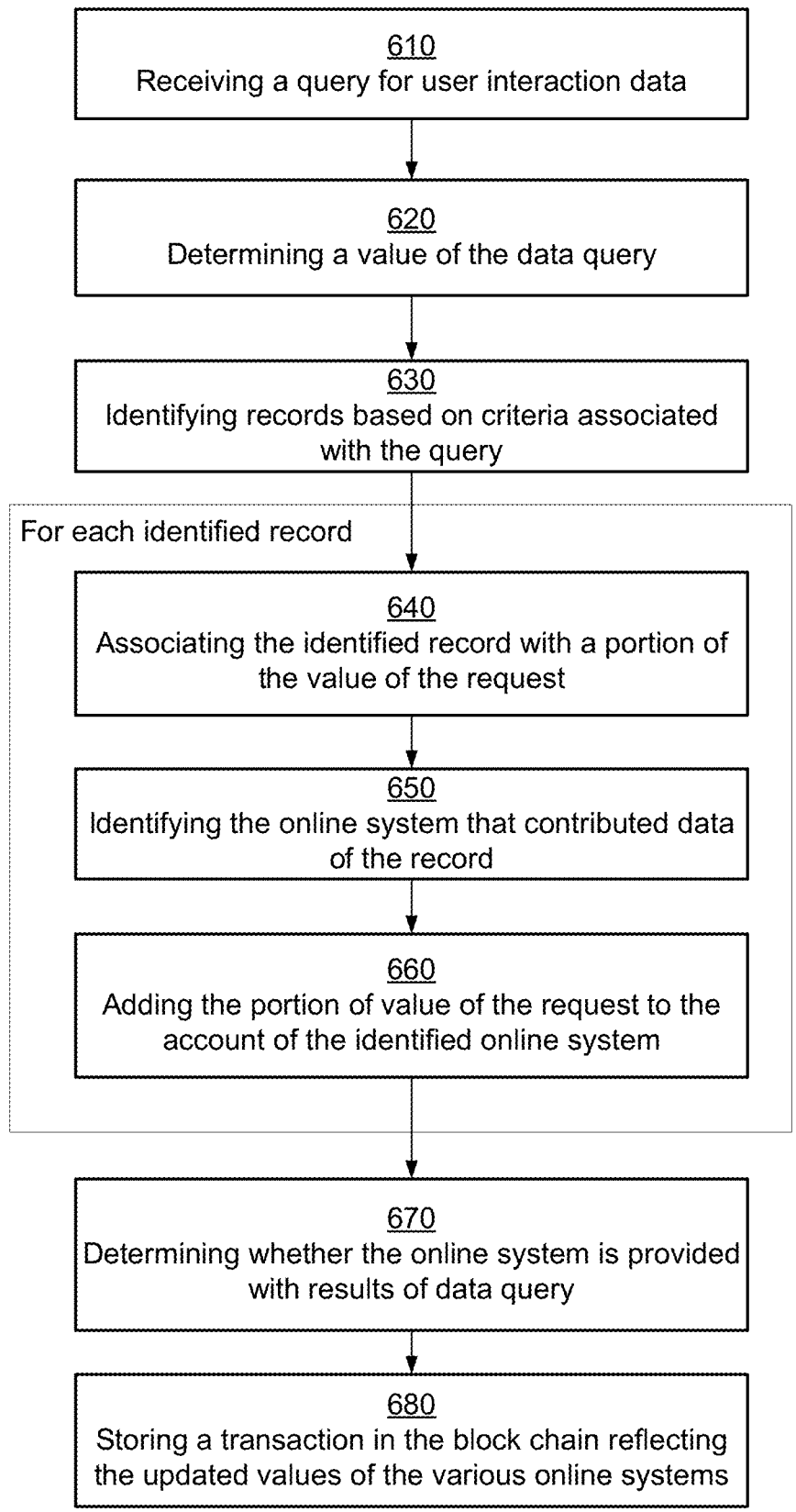
FIG. 6 shows a flowchart illustrating the process for querying user interaction data, according to an embodiment.

FIG. 6 shows a flowchart illustrating the process for querying data representing user interactions, according to an embodiment.

The user interaction data storage system stores a plurality of records comprising user interaction data received from the online systems 110. Each record comprises user interaction data received from an online system 110. The user interaction data describes one or more user interactions performed by a user with the online system 110. A plurality of online systems 110 store a block chain comprising blocks, each block storing one or more transactions. A first subset of the transactions of the block chain are associated with data contribution operations. A second subset of the transactions of the block chain are associated with data consumption operations. A data contribution operation is associated with a contribution of user interaction data by an online system 110 to the database and a data consumption operation is associated with a request for access to user interaction data by an online system 110.

An online system 110 receives 610 a query representing a data access request for user interaction data. The data access request specifies search criteria, for example, user interactions performed by a user in a given time interval, wherein the user is identified using an identifier. Other examples of search criteria include, user interactions related to a topic performed by a user or user interactions associated with certain keywords performed by a user, wherein the keywords should match the content accessed by the user. A system determines a value of the data access request. The system determining the value of the data access request may be an online system 110 or the user interaction data storage system. In an embodiment, different types of requests may be associated with predetermined values. The value of a data access request may also depend on the time, for example, requests received during certain seasons maybe valued higher than requests received in other seasons. Similarly, requests made during certain times of day, for example, evenings may be assigned higher values than request made during early mornings if content providers determine that users are more likely to view the content at certain times of the day, for example, evenings.

The user interaction data storage system 120 identifies 630 a set of records matching the search criteria of the data access request. The user interaction data storage system 120 performs the following steps for each identified record. The user interaction data storage system 120 identifies 640 the online system 110 that contributed data of the record. The user interaction data storage system 120 determines 650 a portion of value of the data access request for associating with the record. The user interaction data storage system 120 adds 660 the portion of value of the data access request to the account of the identified online system 110. In an embodiment, one or more of the steps 630, 640, 650, and 660 are performed by an online system 110.

The user interaction data storage system 120 determines 670 based on the data stored in the block chain, whether the result of the data access request are provided to the online system 110 that sent the data access request. If the user interaction data storage system 120 determines that the result of the data access request should be provided to the requesting online system 110, the user interaction data storage system 120 sends the result of the data access request to the requesting online system 110. The plurality of online systems 110 store 680 one or more transactions in the block chain updating accounts of the online systems 110 that contributed the requested data and the online system 110 that requested the data. The online system 110 that receives the requested data may use the data to determine whether to send certain content items to a user. Accordingly, the online system 110 may send a content item to a user based on the result of the data access request. For example, the content item may be a content item that matches a topic specified in the data access request. Alternatively, the content item may be a content item that matches certain key words that occur in the records returned as results of the data access request. In an embodiment, plurality of online systems 110 store 680 one or more transactions in the block chain reflecting the total value generated and the distribution of value across all the contributing data sources.

Figure 7A:
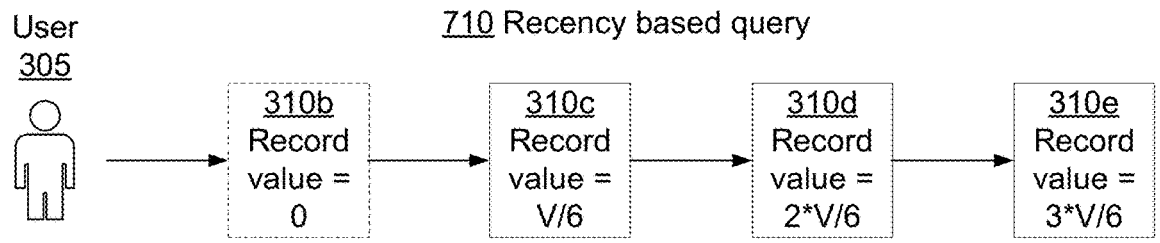
FIGS. 7A, 7B, 7C illustrate assigning values to records based on the type of query, according to an embodiment.
Figure 7B:
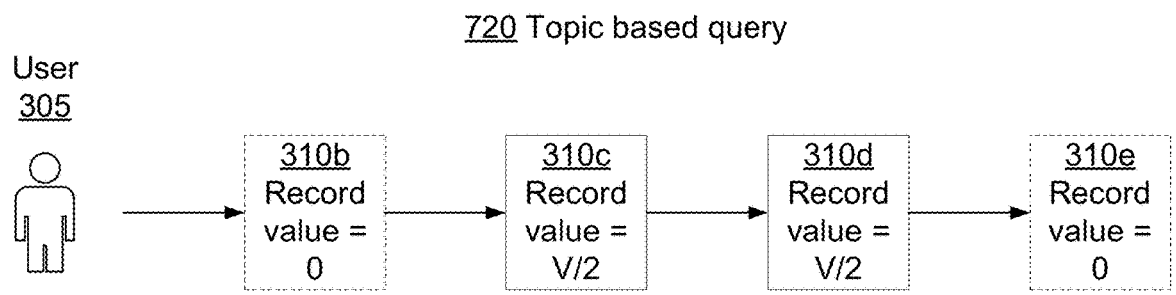
Figure 7C:
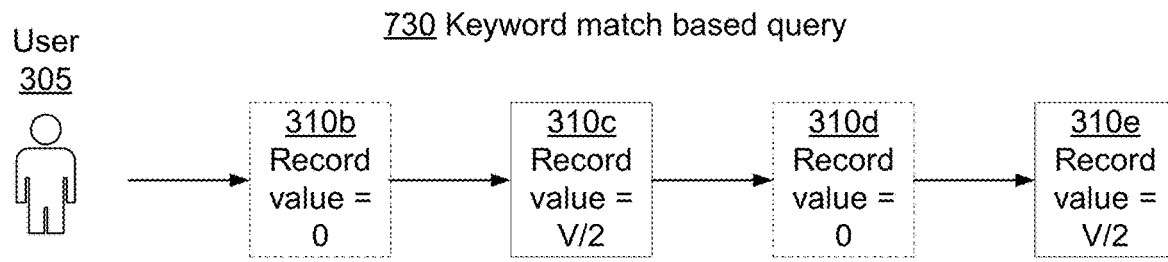

FIGS. 7A, 7B, 7C illustrate assigning values to records based on the type of query, according to an embodiment. FIG. 7A illustrates determining values to records for a recency-based query 710. A recency-based query requests records representing recent user interactions. In an embodiment, a content provider system 150 may request all user interaction data related to user interactions performed during a recent time interval, for example, performed within the past week or within the past day. Accordingly, the recency-based query may specify a recent time interval. As a result, only the records that have a timestamp within the specified time interval have a value. The user interaction data storage system 120 assigns a value for each record that has a timestamp within the specified time interval, for example, records 310c, 310d, and 310e. Furthermore, the user interaction data storage system 120 assigns higher values to recent records as compared to older record. Accordingly, if the total value of the query is determined to be V, the recent most record 310e is assigned value 3V/6, the next recent most record 310d is assigned value 2V/6, the next recent most record 310c is assigned value V/6. Accordingly, the value assigned to a record is inversely related to its age, with older records being assigned lower values and newer records being assigned higher values. Older records are assigned zero value. In an embodiment, the values are assigned by an online system 110. The values of the accounts of the online systems 110 that contributed the records that are assigned non-zero values are updated with the added values, i.e., the values of these accounts are incremented by the respective value of the record. The content provider system that sent the query and requested the information may be another online system 110 and its account is updated to decrease the value by an amount corresponding to the value of the query. In an embodiment, each participating online system 110 that has the value updated may be charged a transaction fee.

FIG. 7B illustrates determining values to records for a topic-based query 710. A topic-based query specifies a topic and requests records representing user interactions matching the specified topic. The value of the query may be equally distributed among all records that match the specified topic. For example, as shown in FIG. 7B, the records 310c and 310d match the specified topic. If the value of the query is determined to be V, each of the records 310c and 310d is assigned a value V/2.

FIG. 7C illustrates determining values to records for a keyword match-based query 730. A keyword match-based query specifies one or more keywords and requests records representing user interactions matching the specified keywords. The value of the query may be equally distributed among all records that match the specified keyword. For example, as shown in FIG. 7B, the records 310c and 310e match the specified topic. If the value of the query is determined to be V, each of the records 310c and 310e is assigned a value V/2.

FIGS. 8A, 8B illustrate storing user interaction data and transaction data, according to an embodiment. FIG. 8A shows the user interaction data 800 that is stored in the user interaction data storage system 120. As shown in FIG. 8A, each user identifier may be associated with one or more records, each record representing user interaction data. Furthermore, the user interaction data storage system 120 may store relations between user identifiers.

FIG. 8B shows the transaction data 810 that is stored in the block chain. Since the amount of storage required to store the user interaction data may be significantly high, the blocks of the block chain that store the transactions simply store a reference to the records representing user interaction data in the user interaction data storage system 120.

Figure 9A:
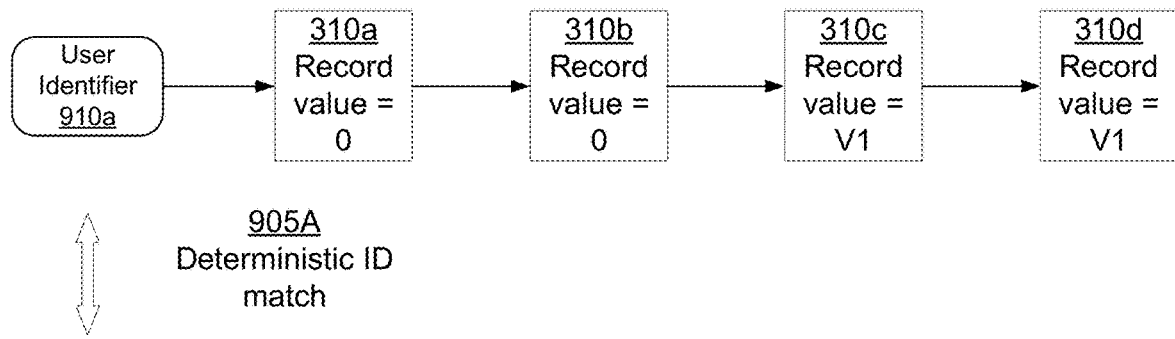
FIGS. 9A, 9B illustrate storing user interaction data and transaction data, according to an embodiment.
Figure 9A:
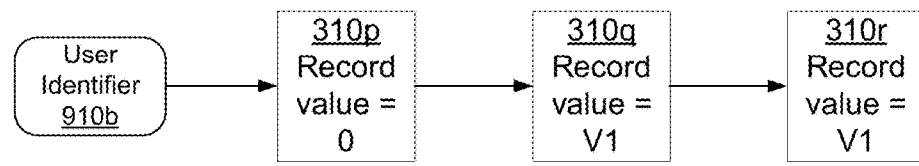
Figure 9B:
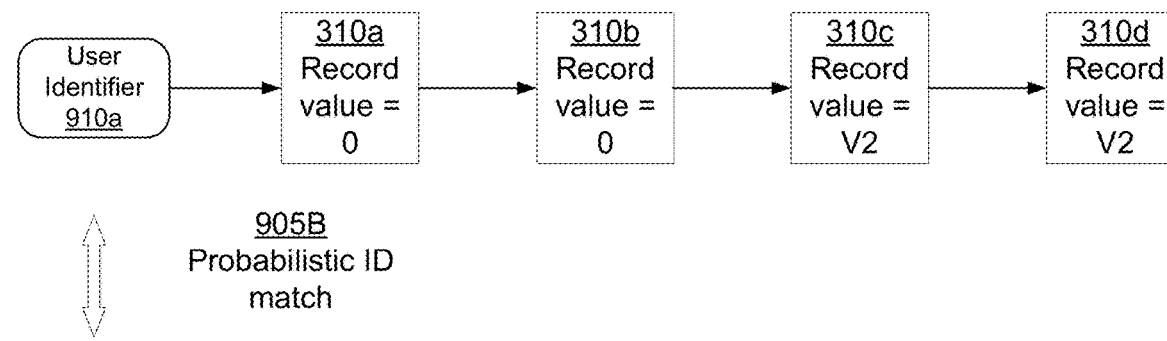
Figure 9B:
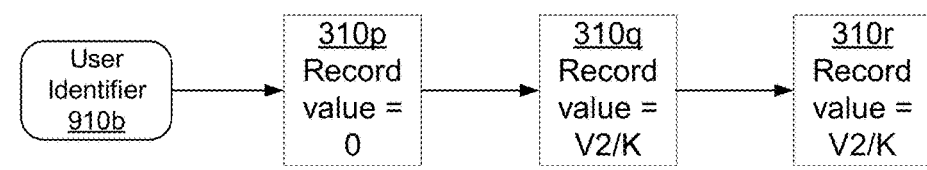

FIGS. 9A, 9B illustrate matching of user identifiers to aggregate user interaction data, according to an embodiment. The user interaction data storage system 120 stores mappings between identifiers that relates identifiers that are likely to represent the same user. Accordingly, if a user provides a login ID (i.e., identifier) and an email address when the user logs into to an online system 110, the user interaction data storage system 120 may assign a high likelihood that the login ID and the email address both represent identifiers for the same user. Accordingly, the user interaction data storage system 120 stores an association between the two identifiers, the email address and the login id and further stores a score indicating a high likelihood of the two identifiers representing the same user.

However, in certain instances the likelihood that two identifiers represent the same user may be low. For example, assume that a client device is shared by two users U1 and U2, wherein the user U1 is identified by ID1 and user U2 is identified by ID2. If the client device provides a cookie that can be used as an identifier, each of the identifiers ID1 and ID2 are associated with the cookie, however since the device is shared, the relation between each identifier (ID1 and ID2) and the cookie has a low score indicating less likelihood that a particular identifier (ID1 or ID2) and the cookie identify the same user. Similarly, the user interaction data storage system 120 may use various heuristics to determine whether two identifiers represent the same user and associates the pair of identifiers with a score indicating a level of certainty with which the user interaction data storage system 120 determines that the two identifiers represent the same user. If two identifiers are determined to represent the same user with more than a threshold level of certainty, the user interaction data storage system 120 determines the match across the identifiers as a deterministic ID match 905A as shown in FIG. 9A. If two identifiers are determined to represent the same user with less than a threshold level of certainty, the user interaction data storage system 120 determines the match across the identifiers as a probabilistic ID match 905B as shown in FIG. 9A.

If a query is processed that matches records associated with identifier ID and identifier ID2 that have a deterministic match, the system 100 assigns the same value V1 to all matching records independent of the identifier that they are associated with. For example, in FIG. 9A, the matching records 310c and 310d are associated with identifier 910a and matching records 310q and 310r are associated with identifier 810b. However all the matching records 310c, 310d, 310q, and 310r are assigned the same value V1.

However, if a query matches records of an identifier ID1 and there is another identifier ID2 that has a probabilistic match with identifier ID1, the records associated with identifier ID2 may be assigned less value compared to the records associated with identifier ID1. For example, in FIG. 9B, the matching records 310c and 310d are associated with identifier 810a and matching records 310q and 310r are associated with identifier 810b. Since the identifiers 810a and 810b as shown in FIG. 8B have probabilistic match, the matching records 310c and 310d are assigned value V2 but records 310q and 310r are assigned value V2/K that is less than V2. The factor K that is determines the ratio of the values assigned depends on the level of certainty of the probabilistic match between the identifiers.

ADDITIONAL CONSIDERATIONS

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

I claim:

1. A method comprising:
   storing, in a database, a plurality of records comprising user interaction data received from a plurality of online systems, each record comprising user interaction data describing one or more user interactions performed by a user with an online system;
   storing, in a plurality of online systems, a block chain comprising blocks, each block recording one or more transactions, each transaction associated with user interaction data stored in the database;
   receiving, from a source online system, a data access request for user interaction data, the data access request specifying a search criteria;
   determining a value of the data access request;
   identifying a set of records matching the search criteria of the data access request;
   for each record from the identified set of records:
      identifying the online system that contributed the data of the record, and
      determining, for the identified online system, a portion of the value of the data access request associated with the record;
   sending the set of records matching the search criteria of the data access request to the source online system;
   storing one or more transactions in the block chain, each of the one or more transactions comprising:
      a data contribution transaction for an online system that contributed a record from the set of records matching the search criteria, the data contribution transaction storing the portion of the value of the data access request determined for the online system, and
      a data consumption transaction for the source online system; and
   sending, by the source online system, a content item to a user based on a result of the data access request.

2. The method of claim 1, wherein a block of the block chain comprising a data contribution transaction stores metadata identifying the record stored in the database.

3. The method of claim 1, wherein the block chain comprises a plurality of blocks replicated across a set of online systems.

4. The method of claim 1, further comprising:
determining based on the data stored in the block chain, whether to provide the result of the data access request to the source online system; and
wherein sending the result of the data access request to the source online system is responsive to determining to provide the result of the data access request to the source online system.

5. The method of claim 4, wherein a data contribution transaction for an online system that contributed a record from the set adds a value based on the portion of the value of the record to a profile of the online system.

6. The method of claim 4, wherein a data consumption transaction for the online system that sent the data access request, reapportions a value based on the value of the data access request from a profile of the source online system.

7. The method of claim 1, wherein the search criteria specifies one or more of: a time range during which user interaction occurred, a keyword matching the user interaction data, or a topic matching the user interactions.

8. The method of claim 1, wherein a value of a record from the set of records matching the data access request is inversely related to an age of the record.

9. The method of claim 1, wherein the database associates a first user identifier with a first set of records and a second identifier with a second set of records, wherein the first user identifier is determined to have a deterministic match with the second identifier, wherein the identified set of records comprises a one or more records from the first set and one or more records from the second set, wherein a record from the first set is assigned the same value as a record from the second set.

10. The method of claim 1, wherein the database associates a first user identifier with a first set of records and a second identifier with a second set of records, wherein the first user identifier is determined to have a probabilistic match with the second identifier, wherein the identified set of records comprises a one or more records from the first set and one or more records from the second set, wherein a record from the first set is assigned a higher value than a record from the second set.

11. A non-transitory computer-readable storage medium storing instructions that when executed by one or more computer processors, cause the one or more computer processors to perform steps comprising:
storing, in a database, a plurality of records comprising user interaction data received from a plurality of online systems, each record comprising user interaction data describing one or more user interactions performed by a user with an online system;
storing, in a plurality of online systems, a block chain comprising blocks, each block recording one or more transactions, each transaction associated with user interaction data stored in the database;
receiving, from a source online system, a data access request for user interaction data, the data access request specifying a search criteria;
determining a value of the data access request;
identifying a set of records matching the search criteria of the data access request;
for each record from the identified set of records:
identifying the online system that contributed the data of the record, and
determining, for the identified online system, a portion of the value of the data access request associated with the record;
sending the set of records matching the search criteria of the data access request to the source online system;
storing one or more transactions in the block chain, each of the one or more transactions comprising:
a data contribution transaction for an online system that contributed a record from the set of records matching the search criteria, the data contribution transaction storing the portion of the value of the data access request determined for the online system, and
a data consumption transaction for the source online system; and
sending, by the source online system, a content item to a user based on a result of the data access request.

12. The non-transitory computer-readable storage medium of claim 11, wherein the instructions further cause the one or more processors to perform steps comprising:
determining based on the data stored in the block chain, whether to provide the result of the data access request to the source online system; and
wherein sending the result of the data access request to the source online system is responsive to determining to provide the result of the data access request to the source online system.

13. The non-transitory computer-readable storage medium of claim 12, wherein a data contribution transaction for an online system that contributed a record from the set adds a value based on the portion of the value of the record to a profile of the online system.

14. The non-transitory computer-readable storage medium of claim 12, wherein a data consumption transaction for the online system that sent the data access request, reapportions a value based on the value of the data access request from a profile of the source online system.

15. The non-transitory computer-readable storage medium of claim 11, wherein the database associates a first user identifier with a first set of records and a second identifier with a second set of records, wherein the first user identifier is determined to have a deterministic match with the second identifier, wherein the identified set of records comprises a one or more records from the first set and one or more records from the second set, wherein a record from the first set is assigned the same value as a record from the second set.

16. The non-transitory computer-readable storage medium of claim 11, wherein the database associates a first user identifier with a first set of records and a second identifier with a second set of records, wherein the first user identifier is determined to have a probabilistic match with the second identifier, wherein the identified set of records comprises a one or more records from the first set and one or more records from the second set, wherein a record from the first set is assigned a higher value than a record from the second set.

17. A method comprising:
storing, in a database, a plurality of records comprising user interaction data received from a plurality of online systems, each record comprising user interaction data describing one or more user interactions performed by a user with an online system;

replicating, in a plurality of online systems, a replicated data store storing one or more transactions, each transaction associated with user interaction data stored in the database;

receiving, from a source online system, a data access request for user interaction data, the data access request specifying search criteria;

determining a value of the data access request;

identifying a set of records matching the search criteria of the data access request;

for each record from the identified set of records:
  identifying the online system that contributed the data of the record, and
  determining, for the identified online system, a portion of the value of the data access request associated with the record;

sending the set of records matching the search criteria of the data access request to the source online system;

storing one or more transactions in the replicated data store, each of the one or more transactions comprising:
  a data contribution transaction for an online system that contributed a record from the set of records matching the search criteria, the data contribution transaction storing the portion of the value of the data access request determined for the online system, and
  a data consumption transaction for the source online system; and sending, by the source online system, a content item to a user based on a result of the data access request.

18. The method of claim 17, further comprising:
determining based on the data stored in the replicated data store, whether to provide the result of the data access request to the source online system; and
wherein sending the result of the data access request to the source online system is responsive to determining to provide the result of the data access request to the source online system.

19. The method of claim 18, wherein a data contribution transaction for an online system that contributed a record from the set adds a value based on the portion of the value of the record to a profile of the online system.

20. The method of claim 18, wherein a data consumption transaction for the online system that sent the data access request, reapportions a value based on the value of the data access request from a profile of the source online system.

* * * * *